March 30, 1965 D. H. RUMBLE 3,176,070
NOISE ANALYZER
Filed Dec. 29, 1961 2 Sheets-Sheet 1

INVENTOR
DALE H. RUMBLE
BY David N. Koffsky
AGENT

March 30, 1965 D. H. RUMBLE 3,176,070

NOISE ANALYZER

Filed Dec. 29, 1961 2 Sheets-Sheet 2

3,176,070

NOISE ANALYZER

Dale H. Rumble, Carmel, N.Y., assignor to International Business Machines Corporation, New York, N.Y., a corporation of New York Filed Dec. 29, 1961, Ser. No. 163,339
11 Claims. (Cl. 178—69)

This invention relates to data communication systems and, more particularly, to a noise analyzer and data gate for use in a data communication system.

Data transmission stations are evolving into increasingly complex systems which encompass not only frequency diversity transmitters, but also varied and different types of pulse modulation equipment, all of which are designed to overcome specific transmission problems. In employing these complex systems, it has been the practice in the past to utilize the operator at the receiving end to analyze the transmission problems and determine what combination of transmitter equipments would best overcome these problems. Needless to say, this was a slow, hit-or-miss method, which was, at best, only a fair solution to the problem. Present requirements for extremely high-speed, reliable data communications preclude any but automatic means for the determination of the best combination of transmission equipments.

A major disturbance encountered in pulse data transmission is noise. It comes from any of a number of sources, e.g., solar sun spots, repeaters, cross-talk, atmospheric disturbances, etc. The noise may take the form of very short pulses which are of less time duration than any expected data pulses, or very long pulses which encompass and mask a succession of data pulses. These types of noise are particularly destructive when the transmission system utilizes pulse-width modulation (PWM) techniques.

Modern receiver circuits are designed to cope with noise signals in a variety of ways. A common method is the use of a parity check. Another encompasses the use of circuitry which attempts to completely exclude or eliminate the noise signals in the first few stages of the receiver. An inherent problem of this latter system is that if it is overcome by the noise, the analysis and solution of the resulting problems are still left to the skill of the operator. For this reason it has been found desirable not to completely exclude received noise signals but to allow them to enter the system and be analyzed.

Accordingly, it is an object of this invention to provide an improved automatic noise analyzer.

It is a further object of this invention to provide a noise analyzer which determines the characteristics of certain types of transmission noise and produces outputs indicative thereof.

It is another object of this invention to provide a system which prevents the entry of noise into the receiving station's data equipment which is wider or narrower than expected data pulses.

It is a further object to provide a noise analyzer with a low-signal-to-noise ratio.

It is still another object of this invention to provide a noise analyzer whose operation is automatically speeded up in the absence of wide noise.

It is an object of this invention to provide a noise analyzer which depends only upon the leading and lagging edges of the noise signals and is, therefore, independent of variations within the noise signal for its analysis procedure.

In accordance with the above stated objects, means are provided to create a test pulse from the leading edge of each received pulse, whether it be noise or information, and to impress the test pulse upon a multiple tap delay means. The lagging edge of the received pulse is then compared in coincidence means and anticoincidence means with the test pulse as it reaches certain taps along the delay means. In this manner, the pulse is analyzed for its time-width characteristic. During the analysis procedure the system input is disabled by a switching means.

If the analyzed pulse is found to be an information pulse, a gating signal is developed which allows the pulse to enter the receiving station. If, however, the pulse is determined to be noise, signals are generated which denote the specific type of noise. Moreover, if it is found that there is little wide-noise being received, a signal is generated which eliminates the wide-noise analysis portion of the system and allows for faster operation of the analyzer.

In response to the analysis of the noise signals, a feedback system generates instruction signals that are transmitted back to the transmitter. These instruction signals are then used to modify the transmission characteristics of the transmitter to compensate for or void the interference being experienced.

The foregoing and other objects, features and advantages of the invention will be apparent from the following more particular description of a preferred embodiment of the invention, as illustrated in the accompanying drawings.

Referring now to the accompanying drawings, the noise analyzer will be described with respect to width modulated pulse signals (PWM). The logical circuits, bistable and monostable flip-flops illustrated therein, are circuits of types well known in the art. Examples of these circuits may be found in "Pulse and Digital Circuits" by Millman and Taub, published by McGraw-Hill 1956.

Figure 2:
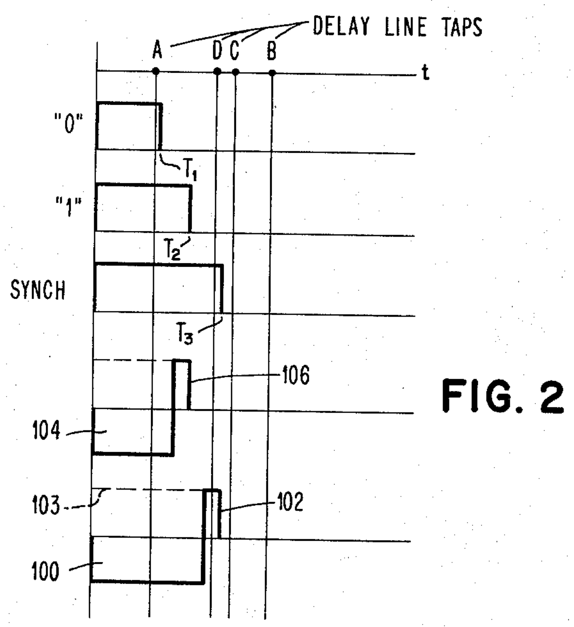
FIG. 2 is a timing chart showing the time relationships which exist between certain signals utilized in the invention shown in FIG. 1.

With reference first to FIG. 2 of the drawings, three PWM signals are of interest in relation to this system, e.g., ONE, ZERO and SYNCH. The ONE, ZERO and SYNCH pulses are represented by pulses of electrical energy of succeeding length in time, the SYNCH pulse being the longest. Each word of information is composed of a multiplicity of ONE's and ZERO's, and is preceded by a SYNCH pulse. The SYNCH pulse indicates to the noise analyzer that a word of information is to follow. Of course, placement of the SYNCH pulse is completely variable at will since, if desired, it could come after each character, message or group of messages; however, for purposes of simplicity it has been placed after every word in this exemplary system. The basic timing of a single complete operation of the noise analyzer is keyed to the Bit Cycle Time, which is the time within which no more than one bit of information can legally exist.

Figure 1:
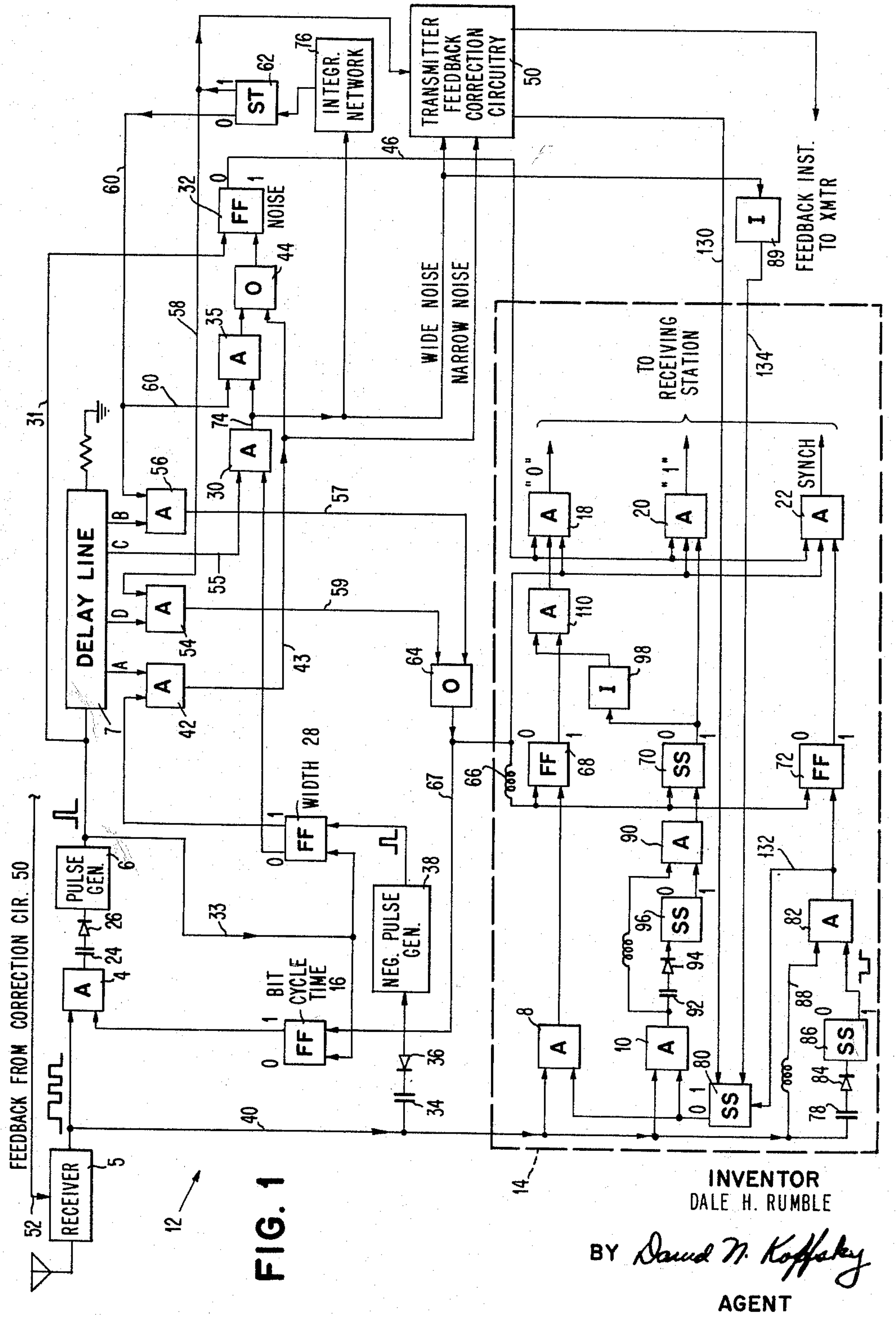
FIG. 1 is a block diagram of a circuit which embodies the invention.

Referring now to FIG. 1, the received information signal, along with any accompanying noise, is amplified and detected in receiver 5 and applied simultaneously to noise analyzer 12 and decoder 14. Decoder 14 takes each signal as it is received; determines whether it is a ZERO, ONE, or SYNCH pulse and in a manner to be described in detail later, produces an output indicative of its determination. The output of decoder 14 is applied to AND circuits 18, 20 and 22. Because decoder 14 has no provisions for distinguishing a noise pulse from a data pulse, it will provide an erroneous output in the presence of a noise signal. To prevent the erroneous output from entering the receiving station, AND circuits 18, 20 and 22 have additional inputs which act to inhibit their outputs if a noise pulse is detected by noise analyzer 12.

With reference to noise analyzer 12, initially the "1" side of Bit Cycle Time flip-flop 16 is energized and it in turn partially conditions AND circuit 4 for the passage of a received signal pulse from receiver 5. Any pulse, whether it be a noise or information is, therefore, passed through AND circuit 4 and impulses capacitor 24. The leading edge of the received pulse is passed through capacitor 24 and diode 26 to pulse generator 6. In response, pulse generator 6 produces a shaped pulse coincident with the leading edge (hereinafter referred to as the "test pulse"). Diode 26 eliminates any negative signals (such as would be produced by the lagging edge of the received pulse) from impulsing pulse generator 6. The test pulse is simultaneously applied to delay line 7; via conductor 31 to the "0" side input of Noise flip-flop 32; and via conductor 33 to the "0" side inputs of Bit Cycle Time flip-flop 16 and Width flip-flop 28.

The application of the test pulse to the "0" side input of Bit Cycle Time flip-flop 16 results in the deenergization of its "1" side output which in turn deconditions AND circuit 4. AND circuit 4 thus prevents the passage of any further signals from receiver 5 into noise analyzer 12 until the "1" side of Bit Cycle Time flip-flop 16 is again reenergized at the termination of the analysis cycle. This disabling or switching of the noise analyzer input effectively lowers the signal-to-noise ratio by eliminating all spurious signals from noise analyzer 12 during the analysis of a received signal.

The application of the test pulse to the "0" side of Width flip-flop 28 energizes its "0" side output and deenergizes its "1" side. The energized "0" side output of Width flip-flop 28 partially conditions AND circuit 30, and its deenergized "1" side output deconditions AND circuit 42.

The test pulse as applied to Noise flip-flop 32, results in the conditioning of its "0" side and the energization of conductor 46. The resulting signal on conductor 46 partially conditions output AND circuits 18 and 20 and 22 of decoder 14. As will be explained hereinafter, if it is determined within Noise analyzer 12 that a received signal is noise, the "0" side output of Noise flip-flop 32 is deenergized thereby deconditioning AND circuits 18, 20 and 22 and preventing any signal outputs into the receiving station.

The above-described initial action occurs for any received pulse whether it be noise or information, and will be mentioned only briefly hereinafter.

Assume now that a noise pulse is received which is narrower than the shortest expected information signal (i.e., ZERO). The above described action will occur with pulse generator 6 providing test pulse coincident with the leading edge of the short noise pulse. The test pulse, in addition to causing the deenergization of AND circuit 4 for the duration of the analysis procedure, is applied to and begins to propagate down delay line 7.

The delay time to tap A represents the maximum width a noise pulse can attain and still be shorter than the shortest expected information pulse (FIG. 2). The lagging edge of the short noise pulse will therefore appear at the output of receiver 5 *before* the test pulse arrives at tap A.

When the negative going portion or lagging edge of the short noise pulse passes through receiver 5 and appears on conductor 40, capacitor 34, in response thereto, produces a negative spike which is passed by diode 36 into negative pulse generator 38. The output of negative pulse generator 38, a shaped pulse coincident with the lagging edge of the short noise pulse, is applied to the "1" side input of Width flip-flop 28. This results in a transfer of energization in Width flip-flop 28 from its "0" side to its "1" side. The energized "1" side output of Width flip-flop 28 partially conditions AND circuit 42, whereas its deenergized "0" side inhibits AND circuit 30. Remember that the above action occurs before the test pulse arrives at tap A.

When the test pulse reaches tap A, it fully conditions AND circuit 42, which thus produces an output on conductor 43 indicative of the fact that a short noise pulse has been detected and that no output is to be allowed to pass from decoder 14. The signal on conductor 43 is passed by OR circuit 44 to the "1" side input of Noise flip-flop 32. This switches Noise flip-flop 32 to its "1" side causing energy to be removed from conductor 46 and thereby deconditioning AND circuits 18, 20 and 22 to inhibit any output therefrom.

In essence then, the output from AND circuit 42 may be likened to an anticoincidence effect, that is, the test pulse on arriving at tap A causes AND circuit 42 to produce an output only after the lagging edge of the narrow noise pulse has passed from receiver 5 (i.e., when there is no signal at the output of receiver 5).

The output from AND circuit 42 is also applied as a Narrow Noise input to transmitter feedback correction circuitry 50. This circuit may contain counters, integrating and logical circuits for determining the corrective action to be taken at the transmission station. If correction circuitry 50 finds that the narrow pulse noise is increasing (thus increasing the probability of confusion between noise and ZERO pulses), it may generate a feedback signal to the transmitter commanding that the width of the ZERO pulses be increased to lessen the probability of confusion. An alternative correction may be to go to another higher or lower transmission frequency. If the alternative procedure is used, the tuner section of receiver 5 is readjusted to receive the lower transmission frequencies by feedback on line 52 from correction circuit 50.

Disregarding for a moment the noise analyzer reset and decoder readout circuitries, assume instead of a narrow-noise pulse, that a noise pulse is received which is wider than any expected signal (i.e. SYNCH). In this case, pulse generator 6 will, as before described, generate a test pulse coincident with the leading edge of the wide-noise pulse and cause it to be propagated down delay line 7. The test pulse will also be applied to Noise flip-flop 32, causing the energization of its "0" side with an attendant partial conditioning of AND circuits 18, 20 and 22. Likewise, the "0" side of Width flip-flop 28 will be energized and its "1" side deenergized resulting in a partial conditioning of AND circuit 30 and the deconditioning of AND circuit 42.

As the test pulse propagates down delay line 7, it reaches tap A. Since the lagging edge of the wide-noise pulse has not yet passed through receiver 5, negative pulse generator 38 has not yet produced an output. Therefore, the "1" side output of Width flip-flop 28 remains deenergized and blocks AND circuit 42 from responding to the test pulse.

The test pulse propagates further down the delay line 7, past tap D (to be explained hereinafter) and reaches tap C. The time delay to tap C is set so that it represents the least width that a noise pulse may have and still be longer than a SYNCH pulse (the longest expected information pulse) FIG. 2. Therefore, if at the time the test pulse arrives at tap C, the lagging edge of the wide noise pulse has *not* yet passed through receiver 5, the received pulse must be a wide-noise pulse. Because the lagging edge of the wide noise pulse has still not appeared on conductor 40, negative pulse generator 38 has not been impulsed and the "0" side output of Width flip-flop 28 into AND circuit 30 remains energized. Therefore, when the test pulse passes down conductor 55, it fully conditions AND circuit 30 which in turn energizes conductor 74.

An output from AND circuit 30 therefore indicates the existence of a wide-noise signal and is the result of a coincidence between the arrival of a test pulse at tap C and the energization of the output of receiver 5 by the lagging portion of the same noise pulse from which the test pulse was derived.

The output of AND circuit 30, as applied to conductor 74, simultaneously impulses AND circuit 35, integrating network 76, inverter 89 and transmitter feedback correction circuitry 50. Conductor 60 provides another input to AND circuit 35. Conductor 60, which derives its energization from the "0" side output of Schmitt Trigger 62, is energized only when there is an appreciable amount of wide noise present in the received signals. Assuming that conductor 60 is energized, the signal on conductor 74 fully conditions AND circuit 35 which provides an ouput to OR circuit 44. The output from OR circuit 44 impulses the "1" side of Noise flip-flop 32 thereby deenergizing its "0" side output. The resulting drop in voltage level on conductor 46 deconditions AND circuits 18, 20 and 22 and prevents any outputs therefrom.

The transmitter feedback correction circuitry 50, in response to the output from AND circuit 30, determines the optimum corrective actions to be taken. Depending upon the amount of wide-noise occurring in the transmission, the corrective action may be to either attempt different transmission frequencies, or in the alternative, to utilize different forms of modulation, e.g., pulse amplitude or pulse coded modulation with increased power levels. A further alternative would be to increase the width of the data pulses until they became wider than the noise. This of course, necessitates a decrease in data rate as well as switching to an alternate noise analyzer having a longer delay line.

With respect now to the noise analyzer reset circuitry, there are two basic recycling periods or "bit cycle times" provided. The first is where there is wide-noise present in the transmission and the second is where little wide-noise is present allowing a speed-up of the data transmission rate. Consider first, the case of the "bit cycle time" where there is wide-noise present in the received signals.

As aforestated, the output of AND circuit 30 is applied to conductor 74 and thence to integrating network 76. The output from integrating network 76 is applied to the "0" side input of Schmitt Trigger 62, and is a voltage whose level is dependent upon the average voltage appearing at the output of AND circuit 30. This voltage is indicative of the amount of wide-noise present in the received signals. An exemplary showing of a Schmitt Trigger may be found at page 165 of Millman and Taub supra. So long as the output from integrating network 76 remains above a certain threshold, the "0" side output of Schmitt Trigger 62 remains energized and its "1" side output deenergized. The "0" side output of Schmitt Trigger 62 is applied to conductor 60 and partially conditions AND circuits 56 and 35. The deenergized "1" side output is applied to conductor 58 and deconditions AND circuit 54. AND circuit 35 as aforedescribed, provides the operative connection between the wide noise analysis portion of the circuit and Noise flip-flop 32 which in turn controls the outputs from decoder 14.

Under the circumstances where wide-noise is present a test pulse derived from the leading edge of a received signal, in propagating down delay line 7 past tap D, has no effect on deconditioned AND circuit 54. When, however, the aforementioned test pulse arrives at tap B, the output therefrom fully conditions AND circuit 56. Conductor 57 is thereby energized and impulses OR circuit 64. The output from OR circuit 64 is applied via conductor 67 to energize the "1" side of Bit Cycle Time flip-flop 16. The energized "1" side output from Bit Cycle Time flip-flop 16 partially conditions AND circuit 4 and readies the noise analyzer 12 for the receipt of the next pulse.

Simultaneously, the output from OR circuit 64 is also applied to AND circuits 18, 20 and 22, as well as through short delay 66, to flip-flops 68, 70 and 72. Remember that the received pulse has been determined to be noise and Noise flip-flop 32 has deenergized conductor 46. Were it not for the deenergized state of conductor 46, the output pulse from OR circuit 64 would fully condition AND circuits 18, 20 and 22 to pass the decoded information, but since the particular pulse analyzed was determined to be noise, no information is gated out.

If little or no wide-noise is being experienced, it is desirable to shorten the analysis or bit cycle time and increase the data rate. This is accomplished when the average voltage output from integrating network 76 falls below the aforementioned threshold indicating a scarcity of analyzed wide-noise signals in the output of AND circuit 30. As a result of the fall in the output from integrating network 76, the energization of Schmitt Trigger 62 switches from its "0" side output to its "1" side output. The energization of the "1" side output of Schmitt Trigger 62 is applied to conductor 58 and partially conditions AND circuit 54. The deenergization of its "0" side output deenergizes conductors 60, deconditioning AND circuits 56 and 35. The deconditioning of AND circuit 35 decouples the wide-noise-analysis portion of analyzer 12 from decoder 14.

As a result of the energization of conductor 58, the arrival of a test pulse at tap D causes the full conditioning of AND circuit 54 and a corresponding output on conductor 59. The signal on conductor 59 is passed by OR circuit 64 to the "0" side input of Bit Cycle Time flip-flop 16 via conductor 67. The reenergization of the "0" side output of Bit Cycle Time flip-flop 16 causes the partial conditioning of AND circuit 4 and the consequent readying of noise analyzer 12 for the next received pulse. In this manner, the bit cycle time of the system is speeded up since the delay time to tap D is considerably less than to tap B. (See FIG. 2.)

The "1" side output from Schmitt Trigger 62 is also used as an "increase bit rate" signal to the transmission feedback correction circuitry 50. An "increase bit rate" instruction is then sent to the transmitter and the rate of data transmission speeded up. The wide-noise-analysis portion of the circuit still functions as before except that its operation does not delay the transmission or analysis of the data. In other words, a test pulse derived from the leading edge of a wide noise pulse will still condition AND circuit 30 and produce a signal on conductor 74. Under these circumstances, an isolated wide-noise pulse may be passed into the receiving station, but the value of the increased data rate far outweighs any possible detriment to the system caused thereby.

Referring now to decoder 14, a signal from receiver 5 is applied to conductor 40 and thence in parallel to AND circuits 8 and 10, capacitor 78 and through a short delay on conductor 88 to AND circuit 82. Assuming that the received signal on conductor 40 is a SYNCH pulse, capacitor 78 and diode 84 combine to produce a positive pulse from its leading edge. This pulse energizes the "0" side input of single shot multivibrator 86, thereby deconditioning its "1" side output into AND circuit 82. The time constant of single shot multivibrator 86 is set so that it deconditions AND circuit 82 for a period which is shorter than the duration of the SYNCH pulse but longer than the duration of either a ONE or ZERO pulse. The "1" side output of single shot multivibrator 86 is indicated in FIG. 2 by negative pulse 100. Pulse 103 is the SYNCH pulse which is applied via conductor 88 to the second input to AND circuit 82. The short delay indicated in conductor 88 is included merely to equalize the delay through capacitor 84 and single shot multivibrator 86 and thus to prevent AND circuit 82 from producing a spurious output. An output from AND circuit 82, pulse 102, is indicative that a SYNCH pulse has been received. By adjusting the time constant of single shot multivibrator 86 in this manner, any signal but a SYNCH pulse or a pulse of wider width is discriminated against.

The output of AND circuit 82, as applied to conductor 132 controls the energization of the "0" side of single shot multivibrator 80, which in turn controls the ZERO and ONE channels in the decoder. Therefore, no information pulses are gated through the ONE and ZERO channels until a SYNCH pulse has been received. The output from AND circuit 82 is also applied to flip-flop 72 and causes the energization of its "1" side output which thereby partially conditions AND gate 22. Single shot multivibrator 80 will also be set by a wide noise signal, but this is compensated for by a feedback reset pulse on conductor 134 (to be described hereinafter).

While the SYNCH pulse is being decoded in decoder 14, pulse analyzer 12 is also operating. The test pulse derived from the leading edge of the SYNCH pulse is applied to Noise flip-flop 32 and delay line 7 by pulse generator 6. When the test pulse reaches tap A, it does not condition AND circuit 42 since the lagging edge of the SYNCH pulse has not yet passed through receiver 5 and impulsed negative pulse generator 38.

If there is little wide-noise present, AND circuit 54 is partially conditioned and AND circuit 56 is deconditioned by the respective "1" and "0" side outputs of Schmitt Trigger 62. Therefore, when the test pulse arrives at tap D, it fully conditions AND circuit 54 and is passed via conductor 59 to OR circuit 64 and back to the "1" side input of Bit Cycle Time flip-flop 16. The resulting "1" side output from Bit Cycle Time flip-flop 16 partially conditions AND circuit 4 and thereby initiates a new cycle. Simultaneously, the output of OR circuit 64 is applied to AND circuits 18, 20 and 22 and through short delay 66 to flip-flops 68, 70 and 72. Likewise, the energized "0" side output from Noise flip-flop 32 is also applied via conductor 46 to AND circuits 18, 20 and 22 (this occurs when an information pulse is detected). Since, by this time, the output from AND circuit 82 has switched flip-flop 72 to its "1" side, the application of the output from OR circuit 64 fully conditions AND circuit 22 and causes an output therefrom indicating a SYNCH pulse to the receiving station. The output from OR circuit 64, which is delayed by delay 66 then impulses and resets flip-flops 68, 70 and 72. Delay 66 is provided to prevent the resetting of flip-flops 68, 70 and 72 until after AND circuits 18, 20 and 22 have been impulsed by the output from OR circuit 64.

A similar operation occurs if there is wide-noise present (the "0" side of Schmitt Trigger 62 energized) and the test pulse derived from the SYNCH pulse has to propagate down to tap B. As the test pulse passes tap C, AND circuit 30 does not respond since the lagging edge of the SYNCH pulse has just previously caused Width flip-flop 28 to deenergize its "0" output. The output from AND circuit 56 is passed by OR circuit 64 and results in the gating out of the decoded information as aforedescribed.

Referring now back to decoder 14, after being impulsed by the output from AND circuit 82, the "0" side of single shot multivibrator 80 is energized for a time period equivalent to a single word duration. At the end of this duration, if more information is to follow, a new SYNCH pulse will be received and reenergize single shot multivibrator 80. If the system is operating on an accelerated bit cycle time (little wide-noise present), then a bias feedback signal on conductor 130 from transmitter feedback correction circuitry 50 reduces the time constant of single shot multivibrator 80 to a point where it is again equivalent to a single word length. As stated before, a wide-noise pulse will cause AND circuit 82 to produce an output which will energize the "0" side of single shot multivibrator 80 thereby erroneously conditioning the ONE and ZERO channels of decoder 14. When the system is operating in the "wide-noise present" mode, this erroneous operation is compensated for in the following manner. The wide-noise indication as derived from AND circuit 30 and applied to conductor 74, impulses inverter 89. Inverter 89 produces a negative pulse on conductor 134 which deconditions the "0" side of single shot multivibrator 80 and blocks the ONE and ZERO channels of decoder 14. This action prevents the false word length gating signal from affecting subsequent operation.

When the system is operating in the "little wide-noise present" mode, a received wide-noise signal will again actuate the "0" side of single shot multivibrator 80. This time however, the information gating signal from OR circuit 64 into AND circuits 18, 20 and 22 precedes the output from AND circuit 30 (wide noise). Therefore, the wide noise signal is gated into the receiving station; but, this is a tolerable error in view of the increased data rate which can be accommodated. Single shot multivibrator 80 is again reset by the output of inverter 89 as aforedescribed.

Figure 3:
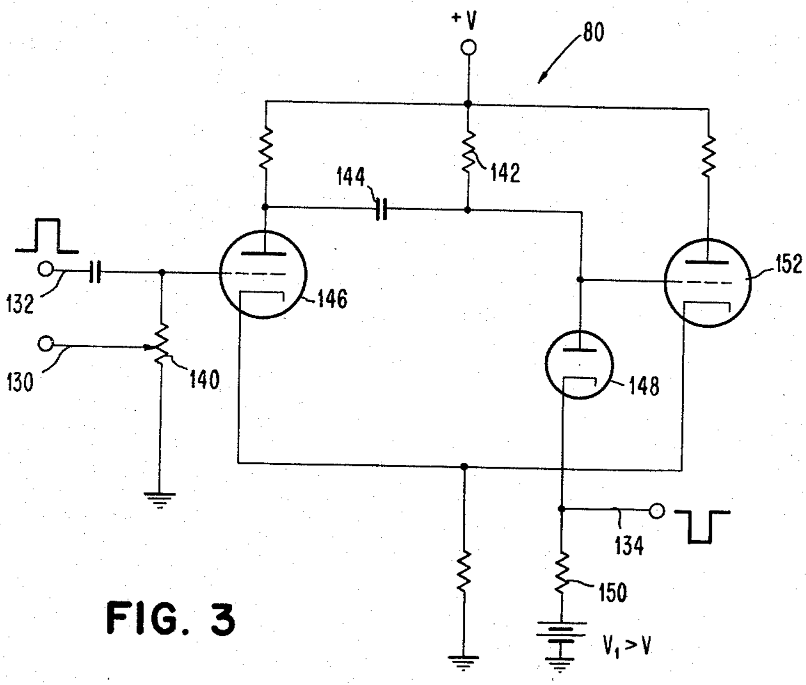
FIG. 3 is a circuit which is utilized in the invention shown in FIG. 1.

FIG. 3 is the circuit diagram for single shot multivibrator 80. It is of the conventional cathode coupled variety (such as shown in Millman and Taub, page 187, supra) with the exception of diode 148 and its attendant circuitry. The time constant of this circuit is determined by the values of capacitor 144, resistor 142 and the grid to cathode voltage appearing across triode 146. Since the grid to cathode voltage of triode 146 is dependent upon the bias applied by conductor 130 to potentiometer 140, the transmitter feedback correction circuitry 50 can, by varying the bias applied to conductor 130, control the time constant of the multivibrator. Conductor 132 is the input from AND circuit 82 and provides the positive initiating pulse to start the operation of the circuit.

The plate of diode 148 is connected to one side of capacitor 144 and its cathode is connected through a small resistor 150 to a source of potential somewhat more positive than the plate potential applied to triodes 146 and 152. Diode 148 is thereby normally biased to a non-conducting state. However, when a wide-noise pulse is detected, single shot multivibrator 80 must be reset; therefore, a negative pulse is applied to conductor 134 by inverter 89 and causes diode 148 to be momentarily biased for conduction. Under these circumstances any charge on capacitor 144 is immediately discharged through diode 148 and single shot multivibrator 80 resets itself. With reference now to FIG. 1 assume that a ONE bit is received at receiver 5 after a SYNCH pulse and is applied to conductor 40. It will condition both AND circuits 8 and 10, causing them to produce outputs (the SYNCH channel will produce no output). The output from AND circuit 8 causes flip-flop 68 to energize its "1" side output. The output from AND circuit 10 is applied directly through a short delay to one input of AND circuit 90. It is also applied to capacitor 92 and diode 94, which combine to provide a positive pulse coincident with the leading edge of the ONE pulse. This positive pulse is applied to single shot multivibrator 96 and causes the deenergization of its "1" side output into AND circuit 90. The duration of this deenergization is indicated by pulse 104 in FIG. 2. The output of AND circuit 90 is therefore a pulse 106 of short duration, which energizes the "1" side output of flip-flop 70. This energization is applied to inverter 98 and causes a drop in voltage level at its output which in turn acts to inhibit any output from AND circuit 110. A ZERO indication is thereby prevented from occurring. The output from flip-flop 70 also partially conditions AND circuit 20. Thus, when the gating signal appears from OR circuit 64, only AND circuit 20 produces an output into the receiving station.

When a ZERO is received, a similar occurrence takes place with the exception of the fact that the output from inverter 98 is an up-level which partially conditions AND circuit 110, thereby allowing the output from flip-flop 68 to partially condition AND circuit 18. The output of single shot multivibrator 96 prevents the ONE channel from producing an output in a manner similar to that described for SYNCH channel.

In noise analyzer 12, the ONE's and ZERO's do not affect the analysis circuitry. By the time a test pulse generated from a ONE or ZERO reaches tap A, its lagging edge has not yet passed through receiver 5 and AND circuit 42 is inhibited from producing an output by the deenergized "1" side output of Width flip-flop 28. In a like manner, when the aforementioned test pulse reaches tap C, AND circuit 30 is prevented from producing an output because the lagging edge of the information pulse has previously caused Width flip-flop 28 to deenergize its "0" side output thereby inhibiting AND gate 30. Since neither AND circuit 42 nor AND circuit 30 produce outputs in the presence of a ONE or ZERO, the "0" side output of noise flip-flop 32 remains energized with the consequent partial conditioning of AND circuits 18, 20 and 22. Then, when the conditioning signal is received from OR circuit 64 each of the aforementioned AND circuits becomes fully conditioned to pass any outputs from flip-flops 68, or 70.

While the invention has been particularly shown and described with reference to a preferred embodiment thereof, it will be understood by those skilled in the art that various changes in form and detail, may be made therein, without departing from the spirit and scope of the invention.

I claim:

1. A circuit means adapted to receive a plurality of information signals having discrete time durations in combination with a noise discrimination crcuit for determining, in the output of said circuit means, the existence of noise signals characterized by greater or lesser time durations than said information signals, said discrimination circuit comprising:
pulse generator means associated with said circuit means for generating a test pulse coincident with the leading edge of a received signal;
delay means connected to an output of said pulse generator means, said delay means having a plurality of taps, the time delay to a first one of said taps being less than the time duration of the shortest expected information signal, the time delay to a second of said taps being greater than the time duration of the longest expected information signal;
anti-coincidence means having an input connected to said first tap and another input associated with said circuit means for generating an output, indicative of narrow noise, only when the occurrence of said test pulse at said first tap succeeds the passage of the lagging edge of said received signal through said circuit means; and,
coincidence means having a first input connected to said second tap and a second input associated with said circuit means for generating a signal, indicative of wide noise, only when said test pulse arrives at said second tap before the lagging edge of said received signal has passed through said circuit means.

2. A circuit means adapted to receive a plurality of information signals having discrete time durations, in combination with a noise discrimination circuit for determining the existence of noise signals characterized by greater or lesser time durations than said information signals in the output of said circuit means, said discrimination circuit comprising:
pulse means connected to said circuit means and responsive to the passage of the leading edge of a signal from said circuit means to generate a test pulse coincident with said leading edge;
delay means connected to an output of said pulse means, said delay means having a plurality of taps, the time delay to a first one of said taps being less than the time duration of the shortest expected information signal, the time delay to a second one of said taps being greater than the time duration of the longest expected information signal;
anti-coincidence means provided with an input connected to said first one of said taps;
coincidence means provided with an input connected to said second one of said taps; and
plural conditioning means connected to said coincidence means and anti-coincidence means including means responsive to said circuit means for conditioning said coincidence means to pass said test pulse only when said signal is present at the output of said circuit means, and including means for conditioning said anti-coincidence means to pass said test pulse only after the lagging edge of said signal passes from said circuit means.

3. The invention as defined in claim 2 with the further provisions of:
decoder means connected to said circuit means for analyzing said received signals and producing outputs indicative of said analyzed signals;
gating means connected to said outputs of said decoder means and responsive to the passage of said test pulse from either said coincidence means or said anti-coincidence means to block said outputs of said decoder means.

4. The invention as defined in claim 2 with the further provisions of:
a third tap on said delay means, the time delay to said third tap being greater than the time delay to said second one of said taps;
switch means coupled to the output of said circuit means, said switch means having an input connected to said pulse means and another input connected to said third tap, said switch means including means being responsive to the generation of said test pulse for decoupling the output of said circuit means from said discrimination circuit and including means responsive to the arrival of said test pulse at said third tap for encoupling the output of said circuit means to said discrimination circuit.

5. The invention as defined in claim 2 with the further provisions of:
a third tap on said delay means, the time delay to said third tap being greater than the time delay to said second one of said taps;
a fourth tap on said delay means, the time delay to said fourth tap being greater than the time delay to said first one of said taps but less than the time delay to said second one of said taps;
third tap gating means connected to said third tap and effective, when conditioned, to produce an output indicative of the arrival of said test pulse at said third tap;
fourth tap gating means connected to said fourth tap and effective, when conditioned, to produce an output indicative of the arrival of said test pulse at said fourth tap;
integrating means connected between said coincidence means and said third tap gating means and fourth tap gating means for averaging the output of said coincidence means and including first means for transmitting a conditioning signal to said third tap gating means when the averaged output from said coincidence means exceeds a predetermined level, and second means for transmitting a conditioning signal to said fourth tap gating means when the averaged output from said coincidence means falls below said predetermined level; and
switch means coupled to the output of said circuit means having a disabling input connected to said pulse means and enabling inputs connected to said third tap gating means and said fourth tap gating means;
whereby the appearance of said test pulse on said enabling input causes said switch means to decouple said circuit means from said discrimination circuit and an output from either said third tap gating means or said fourth tap gating means causes said switch means to encouple said circuit means with said discrimination circuit.

6. The invention as defined in claim 5 with the further provisions of:

decoder means connected to said circuit means for analyzing said received signals and producing outputs indicative of said analyzed signals;

gating means connected to said outputs of said decoder means and responsive to an output from either said coincidence means or said anti-coincidence means to block said outputs from said decoder means.

7. An input circuit adapted to receive a plurality of information signals having discrete time durations, in combination with a noise discrimination circuit for determining the existence of noise signals characterized by greater or lesser time duration than said information signals, said discrimination circuit comprising:

pulse means coupled to said input circuit for generating a test pulse coincident with the leading edge of a received signal;

delay means connected to an output of said pulse means, said delay means having a plurality of taps, the time delay to a first one of said taps being less than the time duration of the shortest expected information signal, the time delay to a second of said taps being greater than the time duration of the longest expected information signal;

generator means coupled to said input circuit for normally producing a first output, and including means responsive to the lagging edge of said received signal to produce a second output;

first coincidence means having inputs connected to said first tap and said generator means and responsive to a coincidence of said second output and said test pulse for producing a signal indicative of narrow noise;

second coincidence means having inputs connected to said second tap and said generator means and responsive to a coincidence of said first output and said test pulse for producing a signal indicative of wide noise.

8. An input circuit adapted to receive a plurality of information signals having discrete time durations, in combination with a discrimination circuit for determining the existence of noise signals of greater or lesser time duration than said information signals, said discrimination circuit comprising:

positive pulse generator means connected to said input circuit for generating a test pulse coincident with the leading edge of a received signal;

negative pulse generator means connected to said input circuit for generating a second pulse coincident with the lagging edge of said received signal;

a first bistable means having a first input connected to said positive pulse generator means, a second input connected to said negative pulse generator means, and first and second outputs, said test pulse causing the energization of said first output and said second pulse causing energization of said second output;

delay means connected to an output of said positive pulse generator means, said delay means having a plurality of taps, the time delay to a first one of said taps being less than time duration of the shortest expected information signal, the time delay to a second of said taps being greater than the time duration of the longest expected information signal;

first coincidence means having inputs connected to said second output of said first bistable means and said first tap for generating a signal indicative of narrow noise when said test pulse and said second output coincide at the inputs of said coincidence means; and second coincidence means having inputs connected to said first output of said bistable means and said second tap for generating a signal indicative of wide noise when said test pulse and said first output coincide at the inputs of said second coincidence means.

9. The invention as described in claim 8 with the further provisions of:

a decoder connected to said input circuit for separating said received signals into predetermined categories, said decoder producing outputs indicative of said separated signals;

gate means connected to said outputs from said decoder, said first coincidence means and said second coincidence means for blocking the passage of said decoder outputs in response to outputs from either said first or second coincidence means.

10. The invention as defined in claim 9 with the further provisions of:

third tap means on said delay means, the time delay to said third tap means being greater than the time delay to said second tap;

switch means connected between said input circuit and said positive pulse generator means and including means responsive to the generation of said test pulse for disconnecting said input circuit from said positive pulse generator means and including means responsive to the passage of said test pulse through said third tap means for connecting said input circuit to said positive pulse generator means.

11. The invention as defined in claim 10 with the further provisions of:

an integrator connected to the output of said second coincidence means for producing a level indicative of the integrated output of said second coincidence means;

fourth tap means on said delay means connected to said switch means, the time delay to said fourth tap means being greater than the time delay to said first tap but less than the time delay to said second tap;

trigger means connected between said integrator and said third tap means and fourth tap means and including means responsive to the output of said integrator falling below a predetermined level to enable said fourth tap means, and including means responsive to the output of said integrator rising above said predetermined level to enable said third tap means.

References Cited by the Examiner

UNITED STATES PATENTS

| | | | |
|---|---|---|---|
| 2,856,457 | 10/58 | Prior et al. | 178—69 |
| 2,938,077 | 5/60 | Holland et al. | 178—69 |

ROBERT H. ROSE, *Primary Examiner.*